United States Patent
Keller et al.

(10) Patent No.: US 11,686,820 B2
(45) Date of Patent: Jun. 27, 2023

(54) OPTICAL SENSOR WITH RING-SHAPED TX/RX APERTURE SHARING ELEMENT (ASE)

(71) Applicant: Raytheon Company, Waltham, MA (US)

(72) Inventors: Sean D. Keller, Tucson, AZ (US); Gerald P. Uyeno, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 296 days.

(21) Appl. No.: 17/071,767

(22) Filed: Oct. 15, 2020

(65) Prior Publication Data

US 2022/0120861 A1 Apr. 21, 2022

(51) Int. Cl.
*G01S 7/481* (2006.01)
*G01S 17/86* (2020.01)
(Continued)

(52) U.S. Cl.
CPC ............ *G01S 7/4813* (2013.01); *G01S 17/86* (2020.01); *G02B 5/001* (2013.01); *G02B 17/004* (2013.01);
(Continued)

(58) Field of Classification Search
CPC ....... G01S 7/4813; G01S 17/86; H04N 23/54; H04N 23/56; H04N 23/55; G02B 5/001;
(Continued)

(56) References Cited

U.S. PATENT DOCUMENTS

| 3,899,145 A | 8/1975 | Stephenson |
| 6,268,944 B1 * | 7/2001 | Szapiel ............... H04B 10/118 398/9 |

(Continued)

FOREIGN PATENT DOCUMENTS

| WO | WO-2022115164 A2 | 6/2022 |
| WO | WO-2022115164 A3 | 6/2022 |

OTHER PUBLICATIONS

"International Application Serial No. PCT/US2021/053725, International Search Report dated Aug. 16, 2022", 4 pgs.

(Continued)

*Primary Examiner* — Marin Pichler
*Assistant Examiner* — Mitchell T Oestreich
(74) *Attorney, Agent, or Firm* — Schwegman Lundberg & Woessner, P.A.

(57) ABSTRACT

Optical sensors and particularly gimbaled optical sensors transmit an active signal at a given wavelength(s) and receive passive signals over a range of wavelengths and the active signal in a common aperture. The sensor includes a Tx/Rx Aperture Sharing Element (ASE) configured with an annular region that couples an active signal having a ring-shaped energy distribution to the telescope for transmission and a center region that couples the passive emissions and the returned active signal to the detector. A beam shaping element such as an Axicon lens, LCWG, Risley Prism, Unstable Optical Resonator or MEMS MMA may be used to form or trace the ring-shaped active signal onto the annular region of the ASE. A focusing optic may be used to reduce the divergence of the active signal so that it is collimated or slightly converging when transmitted such that the returned active signal approximates a spot. A filter wheel may be positioned behind the ASE to present separate passive and active images to the detector. These optical sensors may, for (Continued)

example, be used with guided munitions or autonomous vehicles.

18 Claims, 11 Drawing Sheets

(51) Int. Cl.
| | |
|---|---|
| *G02B 5/00* | (2006.01) |
| *G02B 17/00* | (2006.01) |
| *G02B 26/08* | (2006.01) |
| *G02B 27/09* | (2006.01) |
| *G02B 19/00* | (2006.01) |
| *G02B 26/00* | (2006.01) |
| *H04N 23/54* | (2023.01) |
| *H04N 23/55* | (2023.01) |
| *H04N 23/56* | (2023.01) |
| *F41G 7/22* | (2006.01) |

(52) U.S. Cl.
CPC ....... *G02B 19/0047* (2013.01); *G02B 26/008* (2013.01); *G02B 26/0833* (2013.01); *G02B 27/0955* (2013.01); *G02B 27/0977* (2013.01); *H04N 23/54* (2023.01); *H04N 23/55* (2023.01); *H04N 23/56* (2023.01); *F41G 7/2246* (2013.01); *F41G 7/2253* (2013.01)

(58) Field of Classification Search
CPC ............. G02B 17/004; G02B 19/0047; G02B 26/008; G02B 26/0833; G02B 27/0955; G02B 27/0977; F41G 7/2246; F41G 7/2253

USPC ..................................................... 359/223.1
See application file for complete search history.

(56) References Cited

U.S. PATENT DOCUMENTS

| | | | |
|---|---|---|---|
| 6,359,681 | B1 | 3/2002 | Housand et al. |
| 6,792,028 | B2 | 9/2004 | Cook et al. |
| 7,304,296 | B2 | 12/2007 | Mills et al. |
| 7,626,152 | B2 | 12/2009 | King et al. |
| 7,667,190 | B2 | 2/2010 | Mills et al. |
| 8,380,025 | B2 | 2/2013 | Anderson et al. |
| 9,632,166 | B2 | 4/2017 | Trail et al. |
| 10,267,915 | B2 | 4/2019 | Uyeno et al. |
| 10,444,492 | B2 | 10/2019 | Hopkins et al. |
| 2003/0062468 | A1 | 4/2003 | Byren et al. |
| 2015/0043599 | A1* | 2/2015 | Yanagida ............... H01S 3/1118 372/18 |
| 2022/0107490 | A1 | 4/2022 | Uyeno et al. |
| 2022/0121035 | A1 | 4/2022 | Rogala et al. |
| 2022/0252865 | A1 | 8/2022 | Uyeno et al. |

OTHER PUBLICATIONS

"International Application Serial No. PCT/US2021/053725, Written Opinion dated Aug. 16, 2022", 8 pgs.

Siegman, A. E., "Unstable optical resonators for laser applications", Proceedings of the IEEE, vol. 53, Issue 3, (Mar. 1965), 277-287.

* cited by examiner

OPTICAL SENSOR WITH RING-SHAPED TX/RX APERTURE SHARING ELEMENT (ASE)

BACKGROUND OF THE INVENTION

Field of the Invention

This invention relates to optical sensors and particularly to gimbaled optical sensors that transmit an active signal at a given wavelength and receive passive signals over a range of wavelengths and the active signal return.

Description of the Related Art

Gimbaled optical sensors are commonly used as part of guided munitions and possibly autonomous vehicles. Passive systems use light emissions e.g. IR or visible from a target to detect and track the target. Active systems use an on-board source to emit light e.g. IR or visible, or RF that is reflected from the target to detect and track the target. The active return may be used for ranging, simple guidance commands to a target centroid or active imaging. The on-board source may also be used for other applications. The passive and active systems are often combined.

A typical gimbaled optical sensor includes inner (nod) and outer (roll) gimbals positioned behind a protective dome or window that rotate about orthogonal axes such that the optical axis is pointed into a three-dimensional space. An off-gimbal detector is responsive to a band of wavelengths e.g. Visible or IR (SWIR, MWIR, NIR, LWIR, etc.) A telescope mounted on the inner gimbal along the optical axis collects light from the target to form an intermediate image. Gimbal optics propagate the light over the inner (nod) and outer (roll) gimbals along an optical path while preserving image quality. Off-gimbal focus optics relay the intermediate image to the detector. In some applications, an Aperture Sharing Element (ASE) is positioned in a receive aperture to separate the incident light into different wavelength bands e.g. Visible and IR and direct the light to different detectors. In a passive system, the pointer detects only emissions from the target within the field-of-view (FOV) of the telescope. In a passive system, pointing control of a transmitter is performed "open loop", based only on the detection of the passive emissions of the target.

To add active capabilities, an off-gimbal optical source e.g., a laser, emits light in a narrowband around a specified wavelength. This transmit signal is routed along an optical path (free-space or fiber) along the gimbal axes to a transmit telescope where it is transmitted toward the target. The transmit telescope may be mounted off-axis from the receive telescope or a common Tx/Rx telescope may be used for both transmit (Tx) and receive (Rx). In the later case, an ASE may be positioned in a common aperture to couple the transmit signal from the optical source to the common Tx/Rx telescope and to couple the returned transmit signal and the passive emissions from the target to the detector. An additional ASE may be positioned in the receive path to separate the incident light into different wavelength bands and direct the light to different detectors. Processing of the active signal return again may provide for ranging, centroid guidance or active imaging. This allows for pointing control of a transmitter to be performed "closed loop" based on the desired and actual location of the laser spot on the target.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides optical sensors and particularly gimbaled optical sensors that transmit an active signal at a given wavelength(s) and receive passive signals over a range of wavelengths and the active signal return. The sensor includes a Tx/Rx Aperture Sharing Element (ASE) configured with an annular region (reflective or transmissive) that couples an optical transmit signal having a ring-shaped energy distribution to the telescope for transmission and a center region (transmissive or reflective) that couples the passive emissions and the returned transmit signal towards the detector. A filter wheel may be positioned behind the ASE to present separate passive and active images to the detector. These optical sensors may, for example, be used with guided munitions or autonomous vehicles.

In an embodiment, a common Tx/Rx telescope is mounted on a pair of inner and outer gimbals that point an optical axis. An off-gimbal optical source emits laser energy at a first transmission wavelength at a fixed off-gimbal access point. A beam shaping element forms the laser energy into an optical transmit signal having a ring-shaped energy distribution. A free-space optical path along the first and second gimbal axes couples light from the common Tx/Rx telescope to an off-gimbal detector. An off-gimbal aperture sharing element (ASE) is positioned in a common Tx/Rx aperture in the free-space optical path. An annular region (reflective or transmissive) of the ASE free-space couples the ring-shaped energy distribution of the optical transmit signal from the off-gimbal access point into the free-space optical path and to the common Tx/Rx telescope while maintaining the ring-shaped distribution for transmission towards a scene. A center region (transmissive or reflective) of the ASE couples the returned transmit signal and passive emissions from the scene received by the common Tx/Rx telescope to the off-gimbal detector to image the scene.

In different embodiments, the beam shaping element forms the laser energy into the ring-shaped energy distribution to illuminate the entire annular region. This may, for example, be accomplished with an Axicon lens, an Unstable Optical Resonator or a Micro-Electro-Mechanical System (MEMS) Micro-Mirror Array (MMA). In other embodiments, the beam shaping element may form the laser energy into a beam that is traced around the annular region to form the ring-shaped energy distribution. This may, for example, be accomplished with a Liquid Crystal Waveguide (LCWG), Risley Prisms or a MEMS MMA.

In different embodiments, the ring-shaped shaped energy distribution optical transmit signal may be divergent as it leaves the beam shaping element. If uncorrected, the ring-shaped distribution would diverge as it propagates towards the scene, either missing the target or diminishing the power to unusable levels. Suitably the transmit signal is corrected so that it is either collimated or slightly converging as it exits the telescope so that the returned optical transmit signal approximates a spot that is imaged onto the detector. Slightly converging would maintain the ring-shaped energy distribution as the signal exits the telescope while forming a spot in the far field at the target. A focusing optic may be positioned in front of beam sharing element to either collimate the light or make it slightly converging. In the case of the Unstable Optical Resonator the focusing function may be built into the source. In the case of the MEMS MMA, the Tip, Tilt and possibly Piston capabilities may be used to perform the focusing function. The active elements, such as LCWG, Risley Prisms or MEMS MMA, may adjust the convergence so that the signal approximates a spot based on the range to the target.

In an embodiment, the ASE includes an optically transparent plate. A reflective coating is positioned around the plate to form a reflective annular region around a transmissive center region. The annular region suitably occupies less than 20% and typically less than 10% of the total area. This allows a substantial majority of the light received from the scene e.g. the returned active signal or passive emissions, to pass to the detector.

In other embodiments, the ASE includes an optically transparent plate. A reflective coating at the center of the plate defines a reflective center region and a transmissive annular region. Alternately, a reflective plate may form the reflective center region with an air gap around the plate forming the transmissive annular region. Again, the annular region occupies less than 20% and typically less than 10% of the total area.

In an embodiment, the free-space optical path includes focusing optics that relay an intermediate from the telescope to the off-gimbal detector. The ASE is positioned within the focusing optics suitably within a relay section of the optics where any structure or optical imperfections of the ASE are not imaged at the detector.

In an embodiment, one or more optical sources emit light at a plurality of transmission wavelengths that are coupled via the ASE into the free-space optical path.

In an embodiment, control circuitry processes the passive returns from the detector to generate a guidance command to control the inner and outer gimbals to point the optical axis in an "open-loop" configuration. The control circuitry may process the returns to detect a target and then activate the off-gimbal optical source to engage the target.

In another embodiment, the optical sensor is configured with an ASE that couples the optical transmit signal to the telescope and directs the returned transmit signal and other passive emissions to a detector. The entire assembly including the optical sources and detector may be fixed or may be mounted on one or more gimbals or other mechanisms to point the optical axis.

In an embodiment, a filter wheel is positioned between the ASE and the detector. The filter wheel includes at least a first filter segment configured to pass the returned optical transmit signal at the first transmission wavelength and a second filter segment configured to block the returned optical transmit signal and pass the passive emissions from at least some of the plurality of other wavelengths such that the detector alternately produces active and passive images of the scene. The second filter segment may include multiple sub-segments that pass different bands of passive emissions. The second filter segment may also include a sub-segment that reflects all emissions to facilitate Non-Uniform Correction (NUC). A third segment may be used to pass all of the wavelengths.

In an embodiment, control circuitry coupled to the detector is configured to process passive images of the scene to detect a target, activate the optical source to emit the optical transmit target to illuminate the target, process an active image of the target to provide close-loop feedback to point the optical axis at the target, and process passive images of the target.

These and other features and advantages of the invention will be apparent to those skilled in the art from the following detailed description of preferred embodiments, taken together with the accompanying drawings, in which:

DETAILED DESCRIPTION OF THE INVENTION

The present invention provides optical sensors and particularly gimbaled optical sensors that transmit an active signal and receive the active signal return and passive signals in a common aperture configuration. The sensor includes a ring-shaped Aperture Sharing Element (ASE) in which an annular region (reflective or transmissive) is configured to re-direct a ring-shaped energy distribution of the optical transmit signal provided by an optical source for transmission along an optical axis. A beam shaping element such as an Axicon lens, Unstable Optical Resonator, LCWG, Risley Prism or MEMS MMA is used to form laser energy from an optical sources into the ring-shaped energy distribution. The beam shaping element may either illuminate the entire annular region or trace the beam around the annular region. A focusing optic, either a discrete element or incorporated with the beam shaping element, may be used to correct divergence so that the optical transmit signal is either collimated or converging toward a spot in the far field as it exits the telescope so that the returned optical transmit signal approximates a spot. The active signal returns and the passive emissions from the scene are received along the optical axis and directed via a center region (transmissive or reflective) of the ASE to the detector.

Figure 1A:
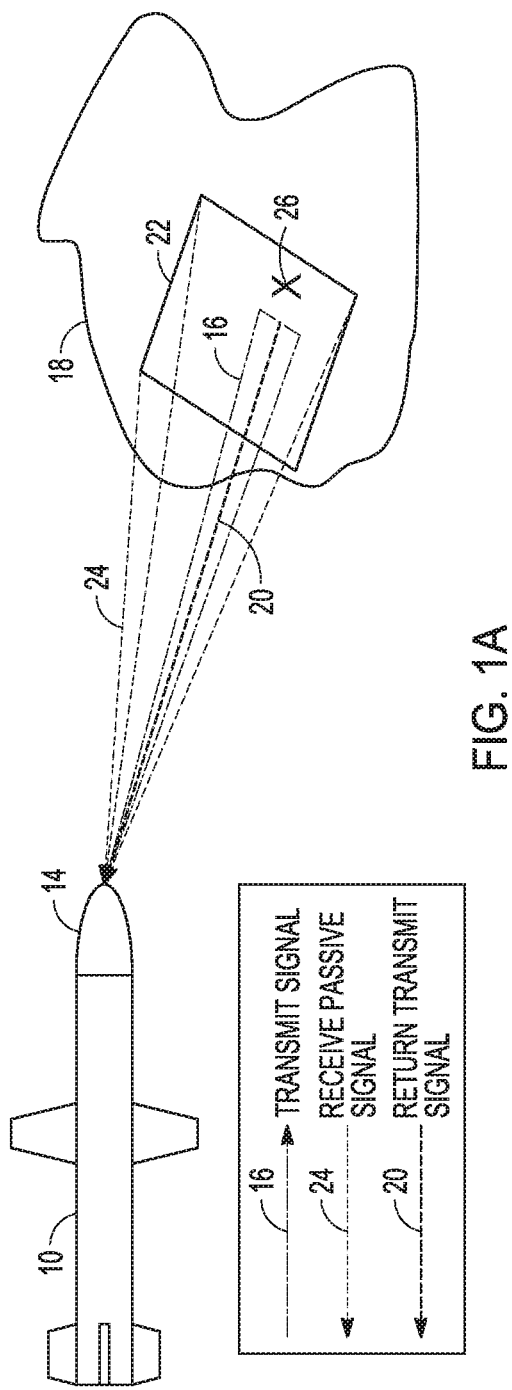
FIGS. 1A and 1B are illustrations of an optical sensor mounted on a guided munition and an autonomous vehicle, respectively, in which in accordance with the present invention an off-gimbal ASE is positioned in a common Tx/Rx aperture to process transmit and receive signals.
Figure 1B:
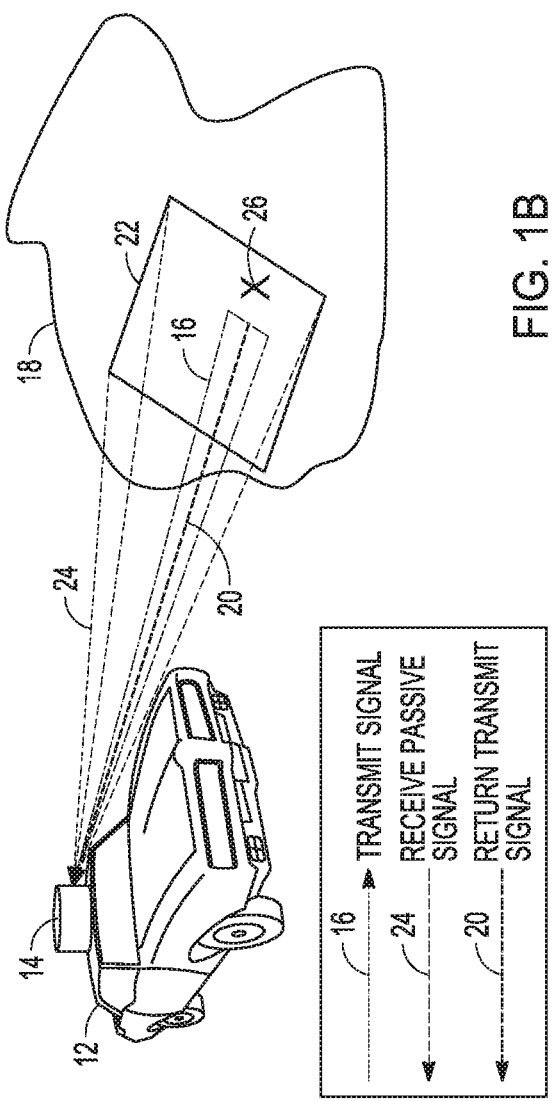

Referring now to FIGS. 1A and 1B, a guided munition 10 such as a missile, rocket, projectile etc. and an autonomous vehicle 12 such as a car, truck, drone, etc., which could be manned or unmanned, are provided with a gimbaled optical sensor 14. The gimbaled optical sensor directs an optical transmit signal 16 having a ring-shaped energy distribution (the "active signal") towards a scene 18, which reflects the light to generate a returned transmit signal 20 that is collected by the sensor's telescope. By controlling the divergence of the ring-shaped energy distribution of the optical transmit signal in combination with the scattering properties of the atmosphere and target, the returned transmit signal will approximate a spot for imaging onto the detector. Within the sensor's field-of-view (FOV) 22 passive emissions 24 are also collected by the sensor's telescope. The optical transmit signal, and thus the returns, may be in the same or different band as the passive emissions. For example, the passive emissions may span a portion of the NIR band and the optical transmit signal could occupy a very narrow band (few nm) around a specific wavelength(s) in the NIR band. Alternately, the passive emissions may span a portion of the NIR band and the optical transmit signal could occupy a narrow band around a specific wavelengths(s) in the Visible band. Other combinations of in and out of band active and passive emissions will exist. Both the passive emissions 24 and the returned transmit signal 20 are collected by the sensor's telescope. The sensor is configured to pass the returned transmit signal 20 and the passive emissions 24 to a detector.

Figure 2:
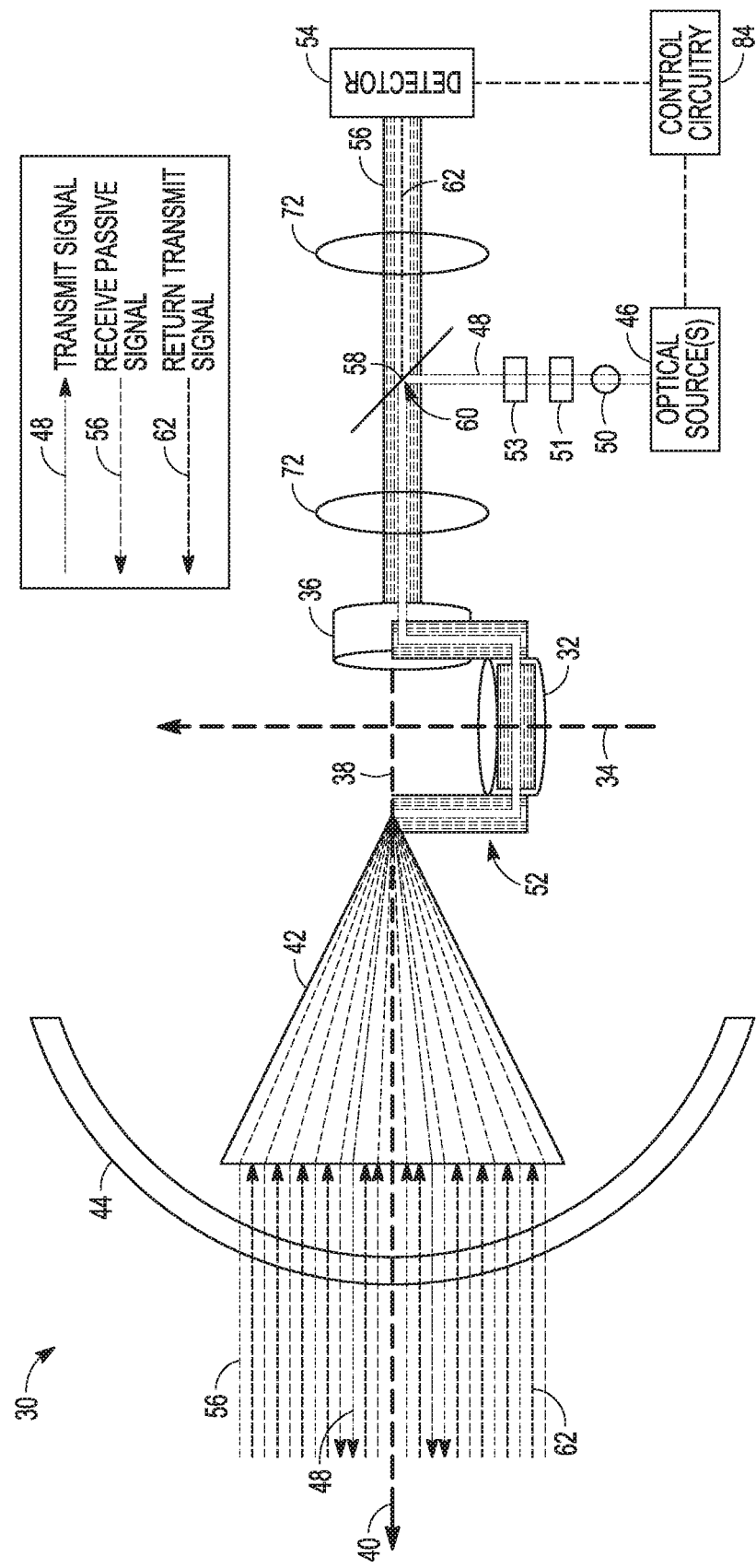
FIG. 2 is a simplified schematic diagram of an embodiment of a gimbaled optical sensor in which an off-gimbal is ASE positioned in a common Tx/Rx aperture.
Figure 3:
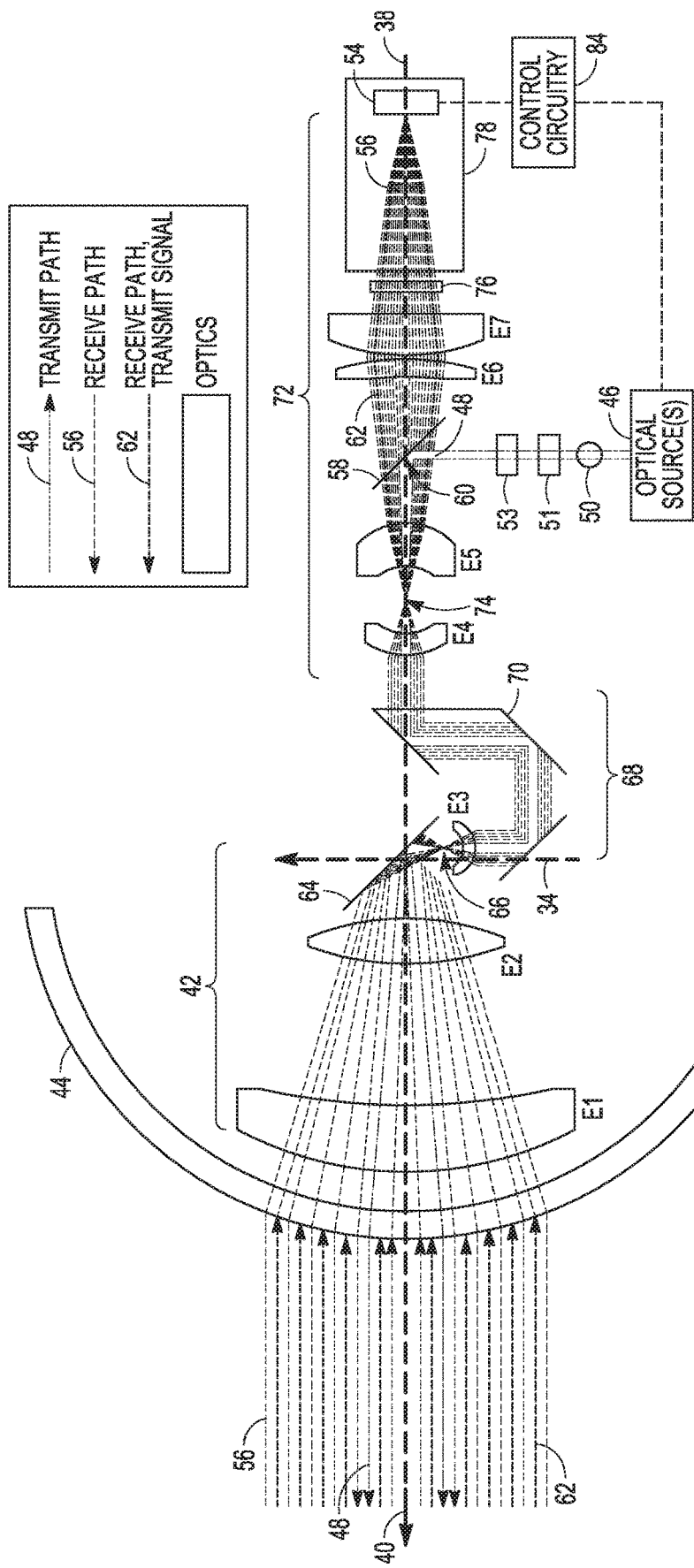
FIG. 3 is a schematic diagram of an embodiment of a gimbaled optical sensor in which an off-gimbal ASE is positioned in a common Tx/Rx aperture.

Referring now to FIGS. 2 and 3, an embodiment of a gimbaled optical sensor 30 includes an outer (roll) gimbal 32 that rotates around a first gimbal axis 34 and an inner (nod) gimbal 36 that rotates around a second gimbal axis 38 orthogonal to the first gimbal axis to point an optical axis 40 in a multi-dimensional space defined by the first and second gimbal axes. A common Tx/Rx telescope 42 is mounted on the inner gimbal along the optical axis behind a protective optically transparent dome 44. An off-gimbal optical source(s) 46 emits laser energy at a first transmission wavelength, perhaps multiple wavelengths, at a fixed off-gimbal access point 50. A beam shaping element 51 forms the laser energy into an optical transmit signal 48 having a ring-shaped energy distribution. A focusing optic 53 reduces the divergence of the ring-shaped energy distribution of the optical transmit signal 48 so that the signal leaving telescope 42 is either collimated or slightly converging. A free-space optical path 52 routed along the first and second gimbal axes couples light 56 from the common Tx/Rx telescope 42 to an off-gimbal detector 54. The transmitted optical transmit signal 48 and received light 56 are co-boresighted along the optical axis 40.

An off-gimbal aperture sharing element (ASE) 58 is positioned in a common Tx/Rx aperture 60 in the free-space optical path 52. An annular region of ASE 58 free-space couples the ring-shaped energy distribution of the optical transmit signal 48 from the off-gimbal access point 50 into the free-space optical path 53 and to the common Tx/Rx telescope for transmission towards a scene. A center region of ASE 58 couples passive emissions 56 from the scene and a returned transmit signal 62 (reflections of optical transmit signal 48 off the scene that approximate a spot) received by the common Tx/Rx telescope, to the off-gimbal detector 54 to image the scene at a plurality of wavelengths.

As more particularly shown in FIG. 3, the optical system of the sensor for a particular embodiment is shown and will be described in additional detail. Many different configurations of the optical system fall within the scope of the invention in which an off-gimbal ASE directs the optical transmit signal from a fixed off-gimbal access point to the telescope and passes the returned optical transmit signal and passive emissions from the scene to an off-gimbal detector in which transmit and receive are co-boresighted.

In this embodiment, optically transparent protective dome 44 has essentially no power. The dome receives collimated light from the scene and outputs collimated, perhaps slightly divergent, light. The dome's function is to maintain a boundary between the environment and the optics. Telescope 42 includes three lens elements E1 and E2 and a turning mirror 64 that focus the collimated light from the scene e.g. optical transmit signal returns or passive emissions, and focus an image of the scene onto a field stop (aperture) 66 that limits the sensor FOV.

Free-space optical path 52 includes gimbal (roll & nod) optics 68 that couple light across the gimbal axes to allow the system to rotate about the axes without impacting image quality. The gimbal optics 68 includes lens element E3 and a prism 70 that recollimate the light at the output face of the prism.

Free-space optical path 52 also includes focus optics 72 that relay the intermediate image of the scene initially formed at field stop 66 to the detector over a sufficient distance to accommodate other optomechanical structures and motors. Focus optics 72 include lens element E4 that focuses the collimated light at the output face of the prism to reimage the intermediate image at a field stop 74. Focus optics 72 includes lens elements E5-E7 that serve to relay the intermediate image from field stop 74 to the detector. Additional elements include a filter 76 that selects and passes specific optical bands of the returned transmit signal and passive emissions through to the detector. For example, filter 76 may include a filter wheel that alternately passes the returned transmit signal and only the passive emissions. The passive portion of the filter wheel may itself serially pass a broadband, a narrowband and performs Non-Uniform Compensation (NUC) on the detector. Many other filter configurations are within the scope of the invention. The detector 54 is part of an integrated Dewar assembly (IDA) 78 that provides a cold volume for detection.

ASE 58 is positioned off gimbal within focus optics 72. The ASE is suitably positioned at a position away from a field stop/image plane at which any structure or optical imperfections of the ASE are not imaged onto the detector. Because the received active and passive signals are passed through the center region to the detector there is no structure in the center region that could be imaged onto the detector. This improves the Modulation Transfer Function (MTF) of the optical system and improves the quality of both the active and passive images. As shown the ASE is positioned within the optical lens elements E8-E11 that relay the intermediate image at a place where the beam is wide and diverging.

The optical system achieves a near diffraction limited output e.g., almost perfect optical performance, devoid of aberrations. Critical to this is the use of the common ASE to free-space couple the optical transmit signal from the fixed access point 50 off-gimbal into the free-space optical path.

Control circuitry 84 processes the returns from the detector to generate a guidance command to control the inner and outer gimbals to point the optic axis and to process active or passive images. In an embodiment, control circuitry is configured to process passive images of the scene to detect a target, activate the optical source to emit the optical transmit target to illuminate the target, process an active image of the target to provide close-loop feedback to point the optical axis at the target, and process passive images of the target.

Figure 4A:
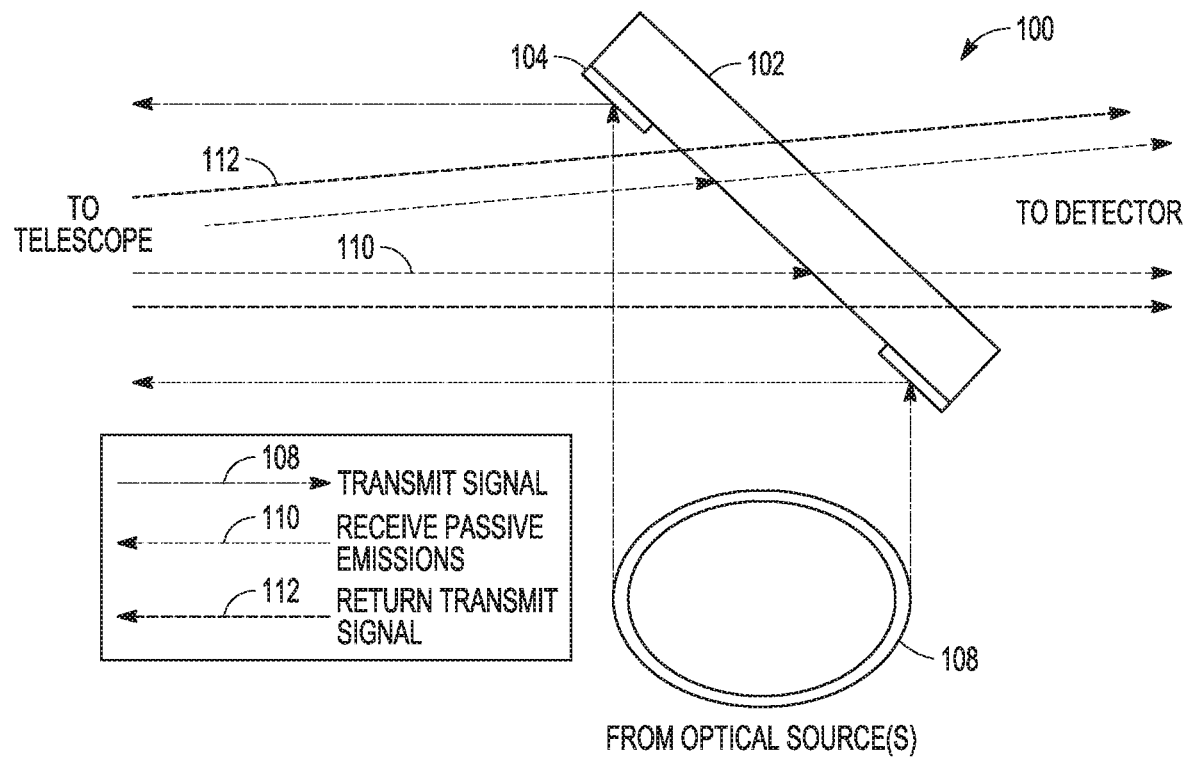
FIGS. 4A and 4B are illustrations of an embodiment of a ring-shaped ASE.
Figure 4B:
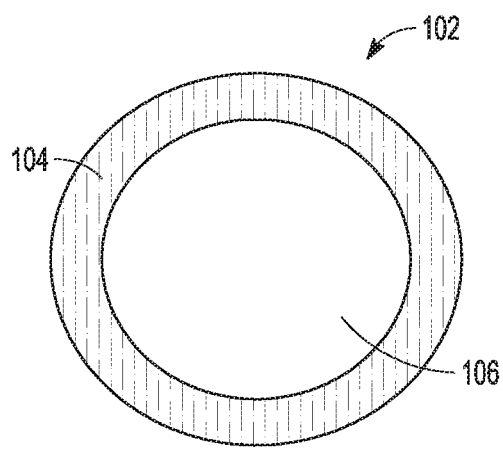

Referring now to FIGS. 4A and 4B, an embodiment of an ASE 100 includes an optically transparent plate 102 that is transmissive at the first transmission wavelength and at least wavelengths of interest for passive emissions from the scene. An annular region 104 formed of a reflective material (reflective to at least a narrowband around the first transmission wavelength) is suitably positioned on a forward (or rear) surface of plate 102 around the edge of the plate to define a transmissive center region 106 such that the transmitted and received signals are co-boresighted. The annular region may be spaced in from the edge.

ASE 100 is positioned to reflect via annular region 104 a divergence-corrected ring-shaped energy distribution of optical transmit signal 108, continuously illuminated or traced, from the off-gimbal optical source at the first transmission wavelength via the beam shaping element and focus optic into the free-space optical path and to the telescope. The ASE 102 transmits light including passive emissions 110 and a returned optical transmit signal 112 received by the common Tx/Rx telescope through center region 106 of the optically transparent plate 102 toward the off-gimbal detector.

Figure 5A:
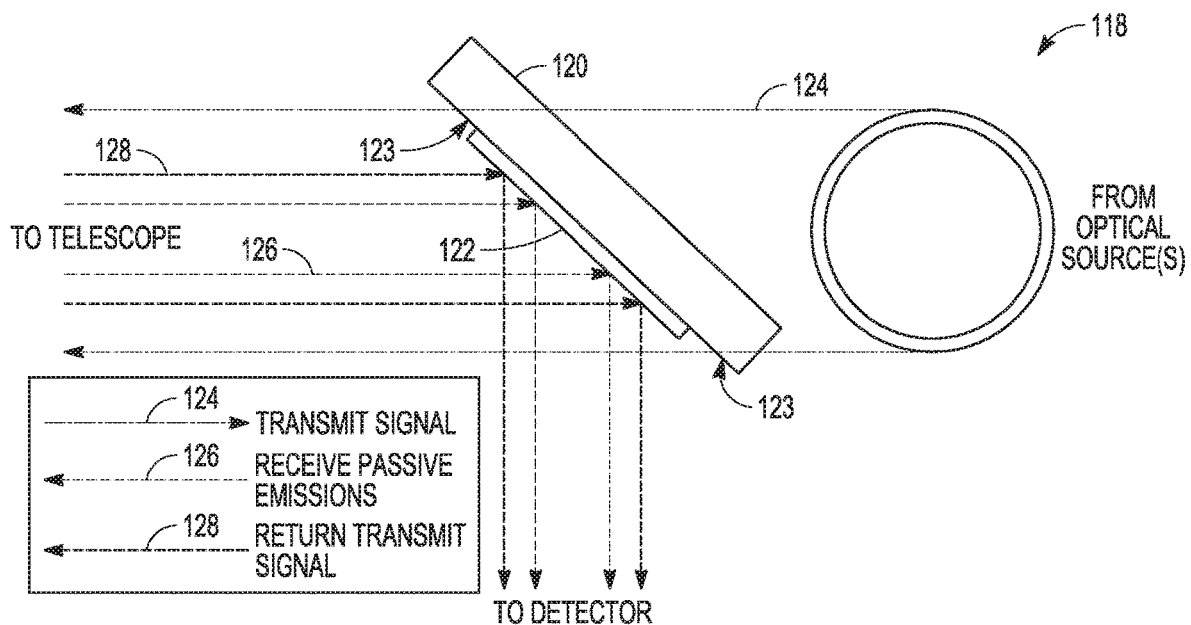
FIGS. 5A and 5B are illustrations of another embodiment of a ring-shaped ASE.
Figure 5B:
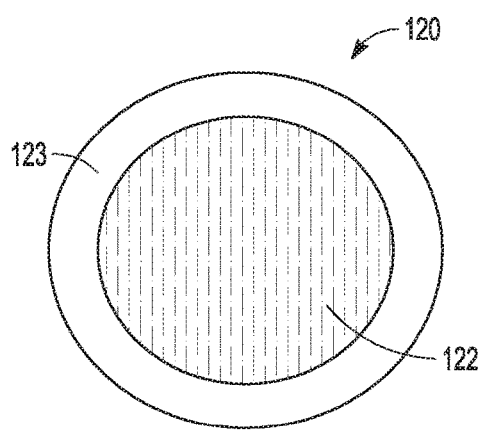

In an alternate embodiment shown in FIGS. 5A and 5B, an embodiment of an ASE 118 includes an optically transparent plate 120. A center region 122 formed of a reflective material is positioned at the center of the plate on a forward (or rear) surface of the plate to define a transmissive annular region 123 around the edge of the plate (or spaced in from the edge). A divergence-corrected ring-shaped energy distribution of optical transmit signal 124 is directed to pass through annular region 123 into the free-space optical path to the telescope. The passive emissions 126 and a returned optical transmit signal 128 are reflected off center region 122 of the plate towards the detector. The optical system of FIGS. 2 and 3 would have to be reconfigured to use ASE 118 with the optical sources positioned to transmit light through annular region 123 and the focus optics and detector positioned to receive the reflected light.

In both embodiments, the "annular region" and the ring-shaped energy distribution of the optical transmit signal should be sized such that substantially all, and preferably all, of the optical transmit signal is directed into the free-space optical path. In either case, failure to do so would result in a reduction in transmit power. In the first embodiment, if the ring-shaped energy distribution of the optical transmit signal is too big for or misaligned with the annular region 104, the high-power signal could be transmitted internal to the system, which is undesirable unless effectively mitigated e.g., dump, baffle, etc. At the same time, the "annular region" should be a relatively small percentage of the aperture in order that nearly all of the passive emissions and returned optical transmit signal may be passed via the center region to the detector. In different embodiments, the annular region should occupy no more than 20% of the aperture and preferably less than 10%.

A beam shaping element is positioned off gimbal at the fixed access point to form laser energy from an optical source or sources into a ring-shaped energy distribution that suitably matches the diameter and width of the annular region of the ASE. The laser energy may be shaped in a manner such that the ring-shaped energy distribution simultaneously illuminates the entire annular region of the ASE. This may, for example, be accomplished with an Axicon lens or with a MEMS MMA suitably configured to form a ring-shaped energy distribution. Alternately, the laser energy may be shaped in a manner such that a laser beam traces the annular region of the ASE to form the ring-shaped energy distribution. This may, for example, be accomplished with the MEMS MMA, Risley Prisms or a LCWG. A focusing optic may be positioned in front of the beam shaping element to reduce the divergence of the ring-shaped energy distribution so that the transmitted signal is either collimated or slightly converging (i.e. converging toward a spot in the far field) whereby the returned optical transmit signal approximates a spot for imaging onto the detector. In different embodiments, the optical source, beam shaping element and focusing optic are discrete and separate components while in other embodiments some or all of the functions are integrated into a single system.

Figure 6:
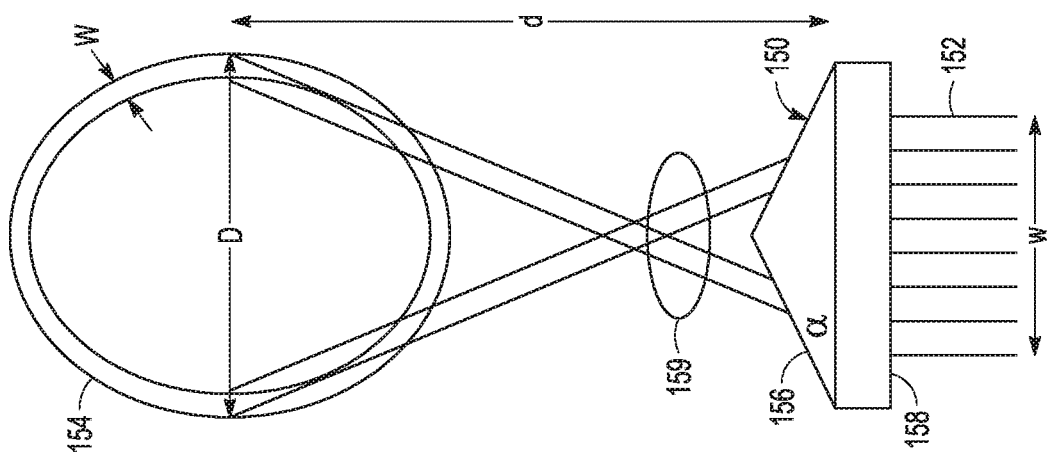
FIG. 6 is a diagram of an embodiment in which an Axicon lens is used to form the ring-shaped energy distribution of the optical transmit signal to illuminate the annular region of the ASE.

Referring now to FIG. 6, an Axicon lens 150 converts parallel laser energy 152 from an optical source into an optical transmit signal 154 having a ring-shaped energy distribution. An Axicon is a specialized type of lens that has a conical surface 156 that transforms a laser beam incident as a plane wave at its back surface 158 into a ring shaped distribution that is laterally constant along the optical axis over a certain range. In general, the Axicon can be convex or concave and made of any optical material. The diameter "D" and width "W" of the ring shaped distribution should approximately match the annular region of the ASE. The width W of the ring shaped distribution is one-half the width w of the laser energy provided by the optical source. The diameter D is a function of the distance d from the Axicon to the ASE, the angle α of the conic surface 156 and the refractive index n of the Axicon. An Axicon implementation has the advantages of being a passive optical element that provides a ring-shaped energy distribution that can illuminate the entire annular region of the ASE. A focusing optic 159 is positioned in front of Axicon lens 150 to reduce the divergence of optical transmit signal 154 so that the signal is either collimated, in which case the focus optic 159 is a collimator, or slightly converging.

Figure 7:
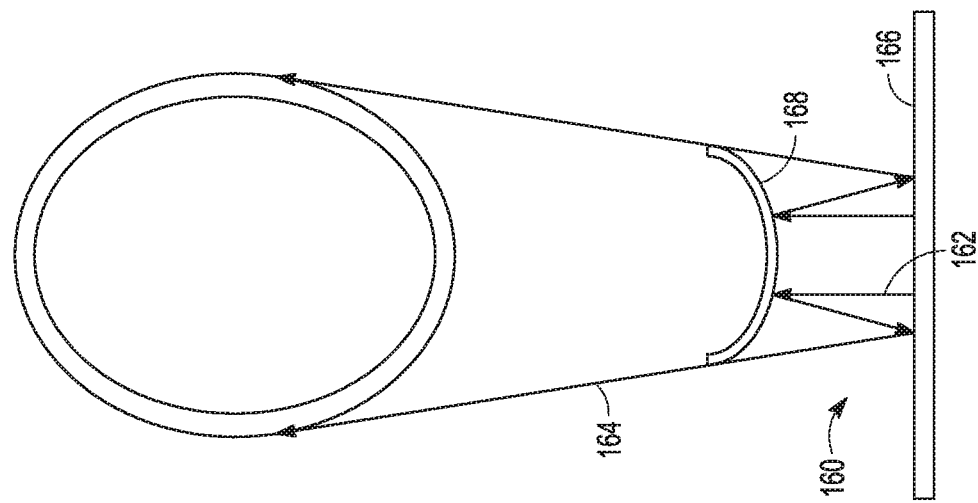
FIG. 7 is a diagram of an embodiment in which an Unstable Optical Resonator used to form the ring-shaped energy distribution of the optical transmit signal to illuminate the annular region of the ASE.

Referring now to FIG. 7, an Unstable Optical Resonator 160 converts parallel laser energy 162 from an optical source into an optical transmit signal 164 having a ring-shaped energy distribution. In general, the Unstable Optical Resonator 160 includes a planar mirror 166 and a divergent spherical mirror 168 whereby laser energy 162 oscillates within the cavity and is emitted as a ring-shaped energy distribution from the edge of spherical mirror 168. The mirrors may be reconfigured so that the transmit signal is emitted from the edge of the planar mirror. The optical source may be incorporated into the Unstable Optical Resonator 160 by providing a gain medium in the cavity and an optical pump. See A. E. Siegman "Unstable Optical Resonators for Laser Applications", Proceedings of the IEEE, pp. 277-287, March 1965. Divergence correction may be provided by a separate focusing optic positioned in front of the Unstable Optical Resonator.

Figure 8:
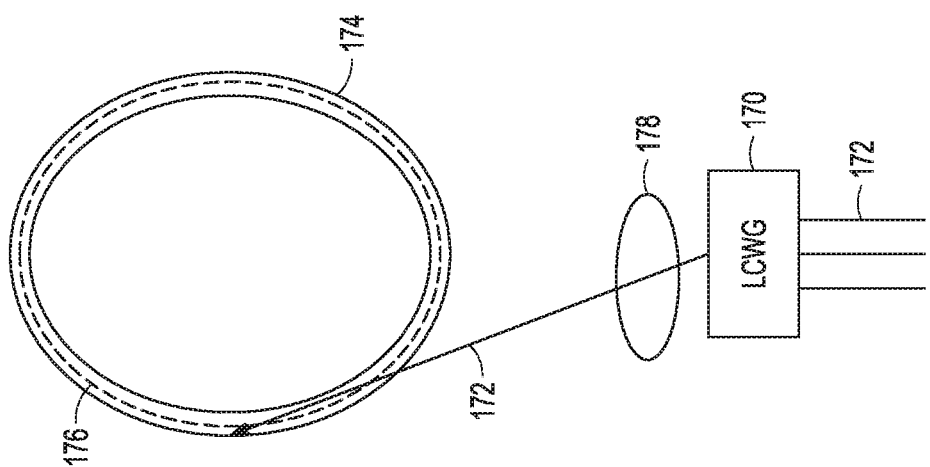
FIG. 8 is a diagram of an embodiment in which a LCWG is used to trace a beam around the annular region of the ASE to form the ring-shaped energy distribution of the optical transmit signal.

Referring now to FIG. 8, a LCWG 170 steers parallel laser energy 172 (an input laser beam) from an optical source around the annular region 174 of an ASE to form optical transmit signal 176 with a ring-shaped energy distribution. In one example, the solid-state liquid crystal waveguide includes a Steerable Electro-Evanescent Optical Reflector offered by Vescent Photonics, Inc. of Golden, Colo. and described in U.S. Pat. No. 8,380,025 entitled "Liquid Crystal Waveguide Having Refractive Shapes for Dynamically Controlling Light". Time varying voltages are applied to the LCWG to transform the liquid crystal material into a refractive shape to form and position a laser spot to trace around the annular region of the ASE. A focusing optic 178 is positioned in front of LCWG 170 to reduce the divergence of beam 172 and transmit signal 176 so that the signal is either collimated, in which case the focus optic 178 is a collimator, or slightly converging. Alternately, a Risley Prism may be used to steer the laser beam around the annular region 174 of the ASE.

Figure 9:
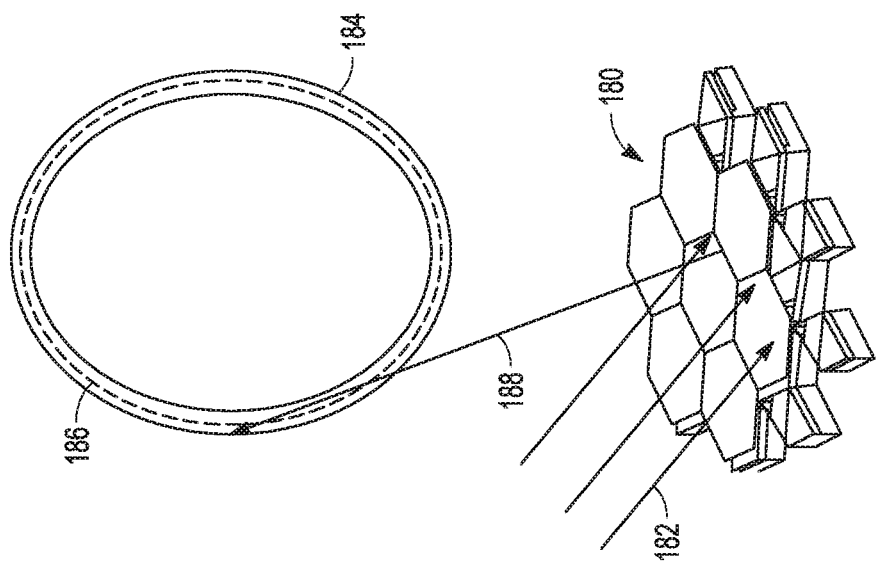
FIG. 9 is a diagram of an embodiment in which a MEMS MMA can either project the ring-shaped energy distribution of the optical transmit signal onto the annular region of the ASE or trace a beam around the annular region of the ASE to form the ring-shaped energy distribution of the optical transmit signal.

Referring now to FIG. 9, a MEMS MMA 180 may be configured to receive parallel laser energy 182 and process the laser energy to either (a) focus the laser energy into an optical transmit signal 184 having a ring-shaped energy distribution that illuminates the entire annular region 186 of an ASE or (b) focus the laser energy into a single beam 188 and steer that beam to trace the annular region 186 of the ASE to form the ring-shaped energy distribution of optical transmit signal 184. A MEMS MMA includes a plurality of independently and continuously controllable mirrors. Each mirror is capable of "Tip" (rotation about an X-axis), "Tilt" (rotation about a Y-axis) and possibly "Piston" (translation along a Z-axis, perpendicular to the XY plane) where the X, Y and Z are orthogonal axes in a three-dimensional space. The mirrors can be independently Tipped and Tilted to focus the laser energy into a ring-shaped energy distribution of the desired diameter D and width W at the surface of the ASE. The Piston capability can be used to improve the formation of the ring-shaped energy distribution by reducing unwanted diffraction at the edges of the tipped and tilted mirrors. Similarly the mirrors may be tipped, tilted and translated to form and trace the beam around the annular region of the ASE. Divergence correction may be provided either by a separate focusing optic positioned in front of the MEMS MMA or by using the Tip/Tilt/Piston capability to reduce divergence.

The MEMS MMA is preferably capable of translating the mirror +/−10 microns at a rate of at least 1 kHz. The MMA is preferably capable of steering a laser beam over a steering range of at least +/−10° in tip and tilt at a steering rate of at least 1 kHz (<1 millisecond). Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. This MEMS MMA is currently being commercialized by Bright Silicon technologies for "digitally controlling light."

Figure 10:
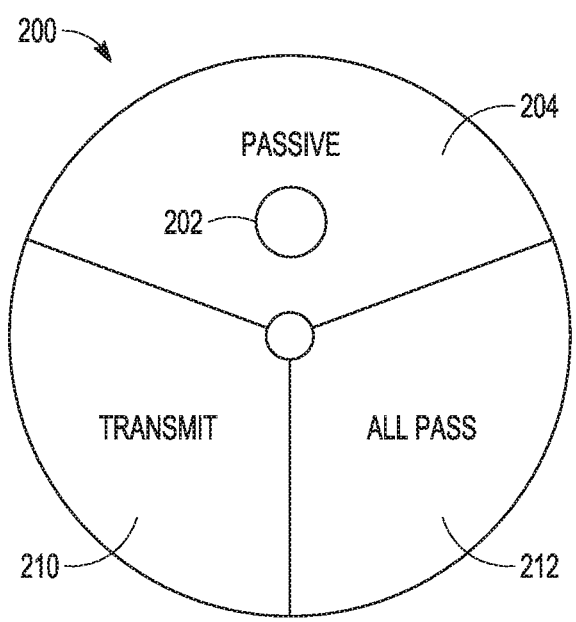
FIGS. 10 and 11A-11B are an illustration of an embodiment of a filter wheel and the filter response for the passive and transmit segments of the filter wheel.
Figure 11A:
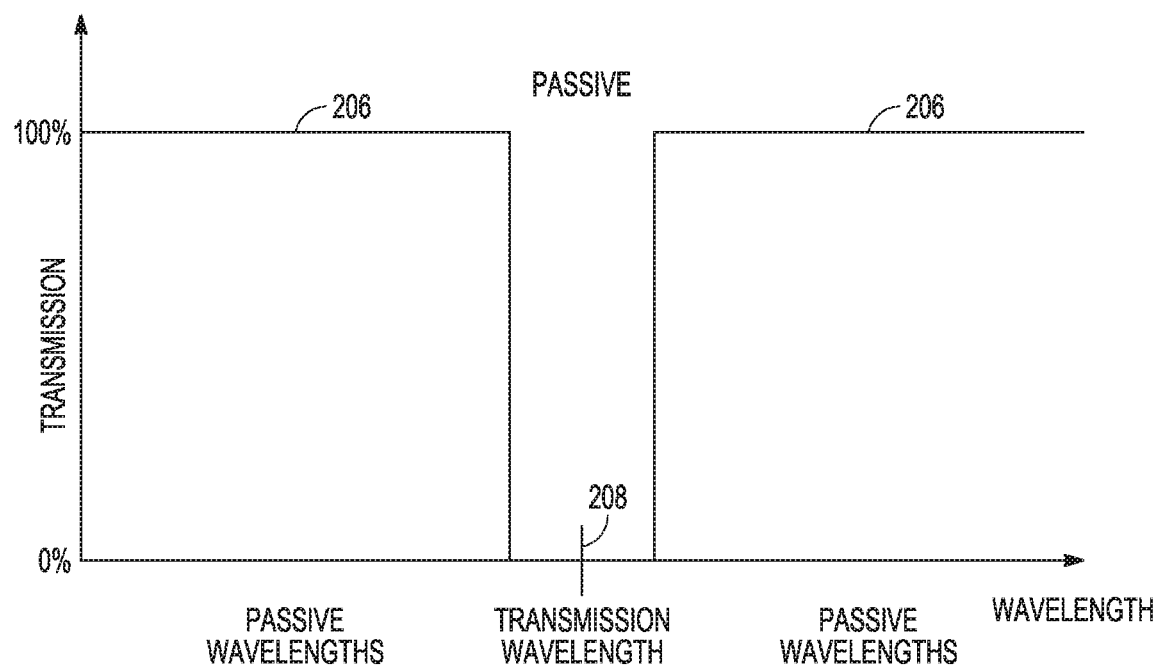
Figure 11B:
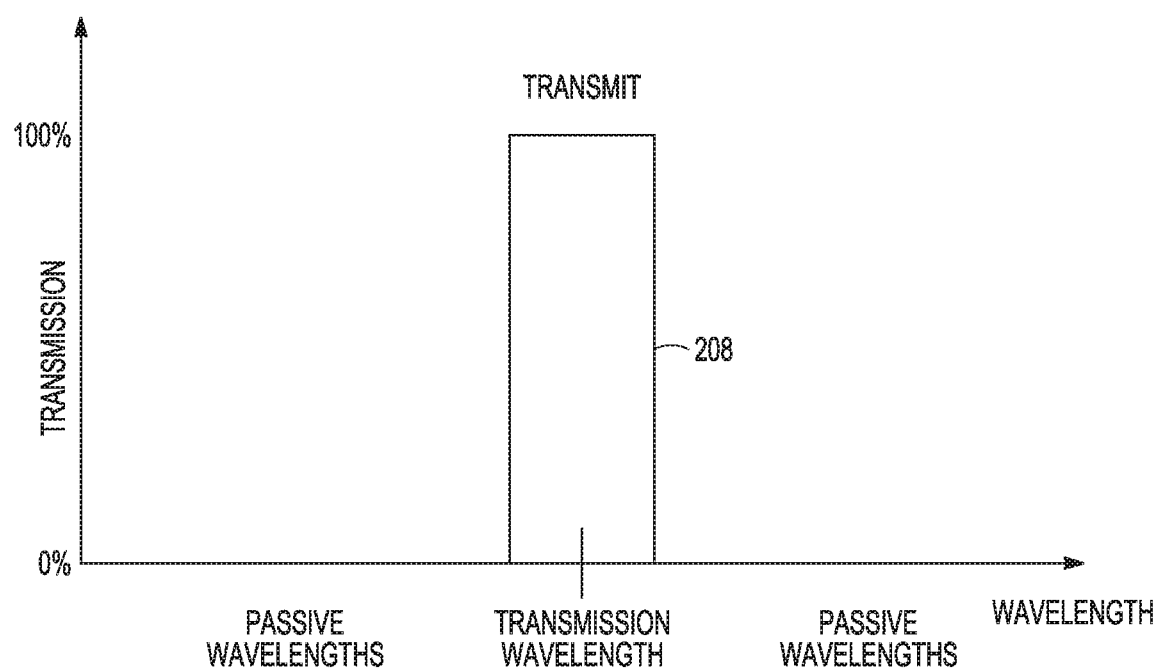
Figure 12:
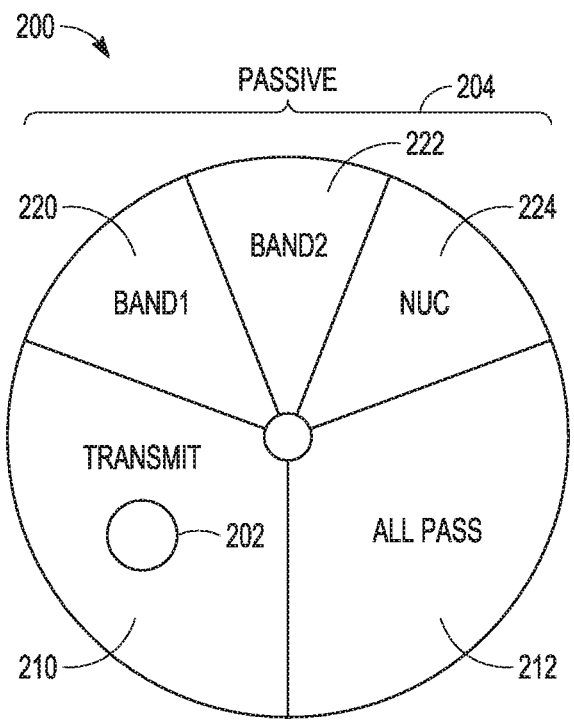
FIGS. 12 and 13A-13C are an illustration of an embodiment of a filter wheel and the filter response different sub-segments of the passive segment.
Figure 13A:
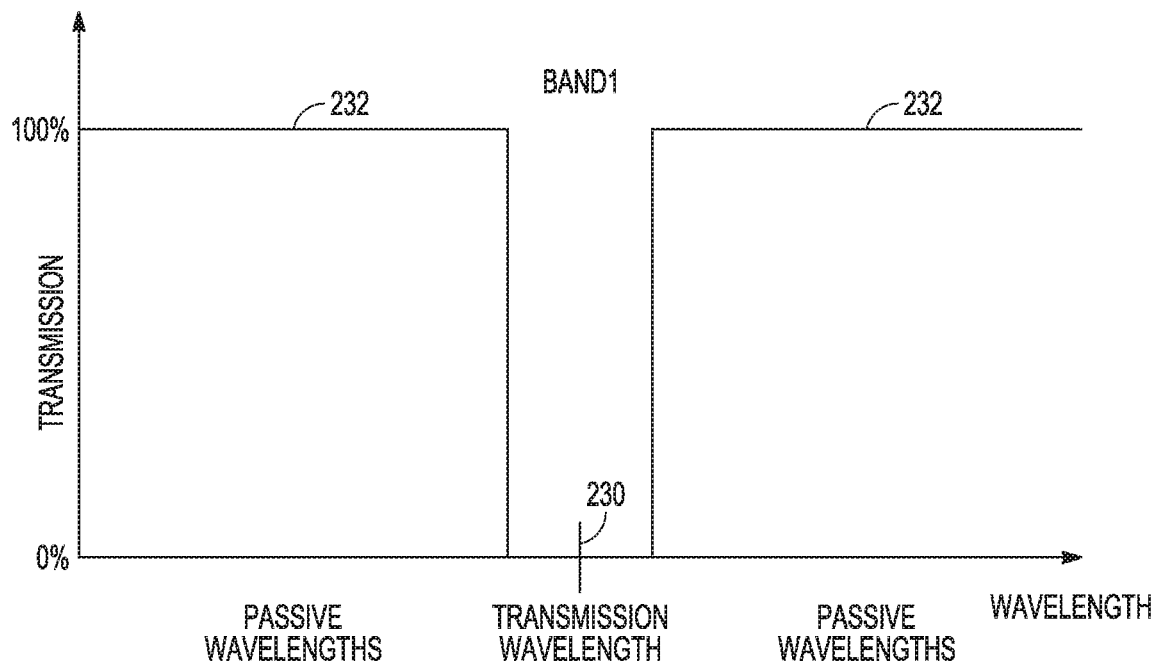
Figure 13B:
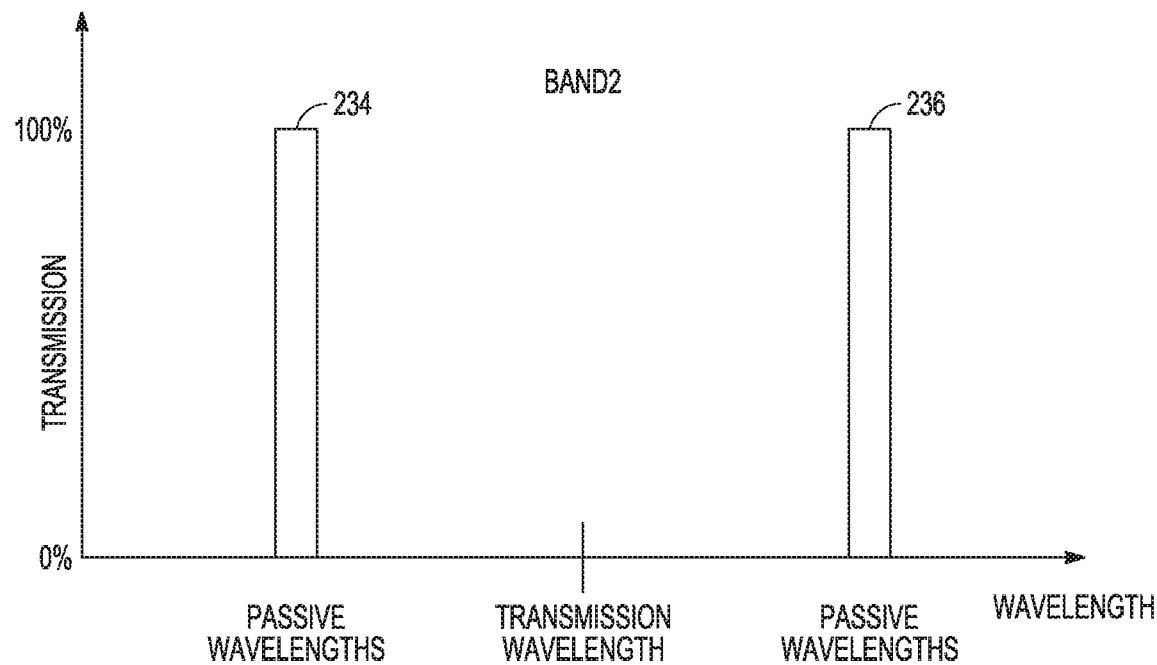
Figure 13C:
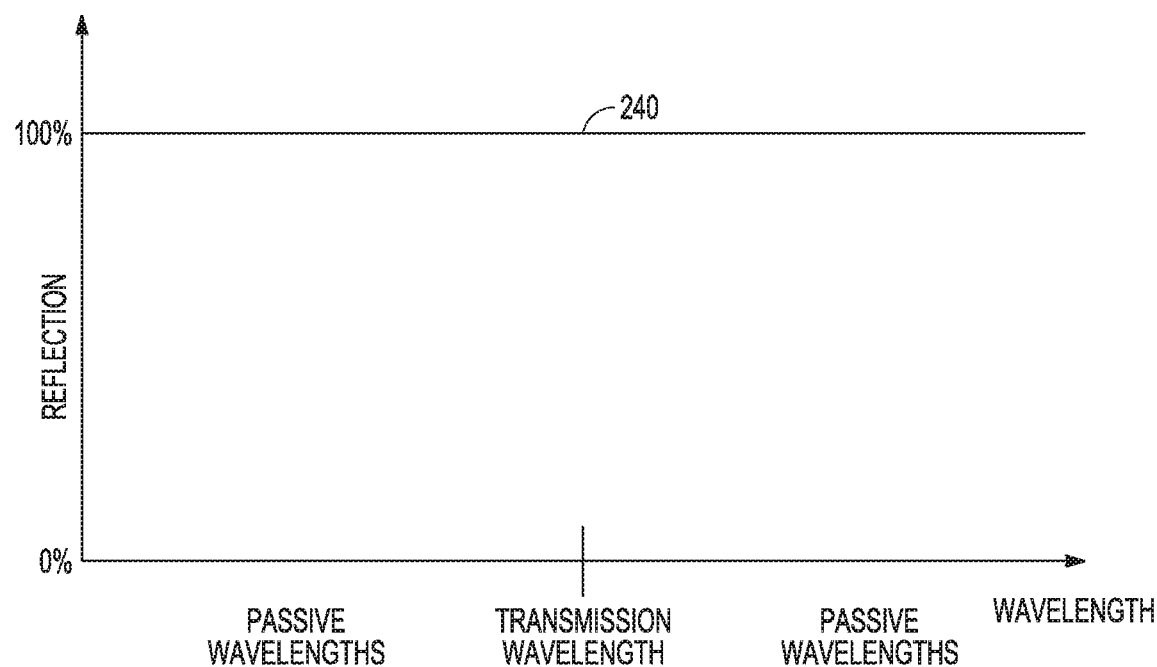

Referring now to FIGS. 10 and 11A-11B, in an embodiment a rotating filter wheel 200 is positioned between the ASE and the gimbal so that a beam 202 of received light (returned optical transmit signal and passive scene emissions) is time-sequentially filtered by a plurality of filter segments. In this embodiment, filter wheel 200 includes a passive segment 204 that passes all wavelengths 206 except a narrowband 208 centered about the first transmission wavelength, a transmit segment 210 that passes only the narrowband 208 centered about the first transmission wavelength and an all pass segment 212 that passes all wavelengths. The percentage of a rotation period each segment occupies is arbitrary and based on the requirements of a specific application or mission. This percentage can be controlled by the angle subtended by a segment, the rotation rate or a combination thereof. A different embodiment may include only the passive and transmit segments. The control circuitry may be configured to process passive images of the scene to detect a target (passive segment), to activate the optical source to emit the optical transmit target to illuminate the target, to process an active image of the target to provide close-loop feedback to point the optical sensor at the target (active segment), and to process passive images of the target (passive segment).

Referring now to FIGS. 12 and 13A-13C, in an embodiment passive segment 204 is divided into Band1, Band2 and NUC (Non-Uniform Correction) segments 220, 222, and 224, respectively. Band1 220 rejects the narrowband 230 around the transmission wavelength and passes the remaining wavelengths 232. Band2 222 passes two narrowbands 234 and 236 corresponding to two particular wavelengths of interest. NUC 224 reflects all wavelengths 240 to enable Non-Uniform Correction of the detector. When no light from the scene passes through the detector, the only detected emissions are from the "flat" field of the NUC segment, which enables the detector (or signal processing) to correct for the non-uniformities of certain optical elements behind the filter wheel and noise on the detector. Again, the relative sizes of the segments are arbitrary and dependent on the application or mission. This percentage can be controlled by the angle subtended by a segment, the rotation rate or a combination thereof.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor, comprising:
an outer gimbal that rotates around a first gimbal axis;
an inner gimbal that rotates around a second gimbal axis orthogonal to the first gimbal axis to point an optical axis in a multi-dimensional space defined by said first and second gimbal axes;
a common Tx/Rx telescope mounted on the inner gimbal along the optical axis;
an off-gimbal optical source that emits laser energy a first transmission wavelength at a fixed off-gimbal access point;
a beam shaping element that forms the laser energy into an optical transmit signal having a ring-shaped energy distribution;
an off-gimbal detector responsive to light at a plurality of wavelengths;
a free-space optical path along the first and second gimbal axes to couple light from the common Tx/Rx telescope to the off-gimbal detector; and
an off-gimbal aperture sharing element (ASE) positioned in a common Tx/Rx aperture in the free-space optical path, said ASE comprising a center region and an annular region,
wherein the ring-shaped energy distribution of the optical transmit signal is directed onto the annular region of the ASE to free-space couple the optical transmit signal into the free-space optical path and to the common Tx/Rx telescope while maintaining the ring-shaped energy distribution for transmission towards a scene,
wherein light returned from the scene and received by the common Tx/Rx telescope is directed onto the center region of the ASE to free-space couple the light to the off-gimbal detector to image the scene.

2. The optical sensor of claim 1, wherein the beam shaping element comprises an Axicon lens that simultaneously illuminates the entire annular region of the ASE with the ring-shaped energy distribution of the optical transmit signal.

3. The optical sensor of claim 1, wherein the beam shaping element comprises an Unstable Optical Resonator that simultaneously illuminates the entire annular region of the ASE with the ring-shaped energy distribution of the optical transmit signal.

4. The optical sensor of claim 1, wherein the beam shaping element comprises a Liquid Crystal Waveguide (LCWG) or Risley Prism that traces a beam of laser energy around the annular region of the ASE to form the ring-shaped energy distribution.

5. The optical sensor of claim 1, wherein the beam shaping element comprises a Micro-Electro-Mechanical System (MEMS) Micro-Mirror Array (MMA) configured to either simultaneously illuminate the entire annular region of the ASE or to trace a beam of laser energy around the annular region of the ASE.

6. The optical sensor of claim 1, further comprising:
a focusing optic that reduces the divergence of the optical transmit signal so that the ring-shaped energy distribution of the optical transmit signal exiting the common Tx/Rx telescope is either collimated or slightly converging.

7. The optical sensor of claim 1, wherein the ASE comprises:
a plate that is optically transparent to the first transmission wavelength and a plurality of other wavelengths for passive emissions from the scene; and
a reflective annular region on a surface of the plate, said reflective annular region being optically reflective to the first transmission wavelength to form the annular region, a portion of the optically transparent plate within the reflective annular region forming the center region,
wherein said beam shaping element directs the ring-shaped energy distribution of the optical transmit signal onto the annular region, which reflects the optical transmit signal into the free-space optical path;
wherein light returned from the scene passes through the center region to the detector.

8. The optical sensor of claim 1, wherein the ASE comprises:
a plate that is optically reflective to the first transmission wavelength and a plurality of other wavelengths for passive emissions from the scene that forms the center region; and
a transmissive annular region around the center region that forms the annular region,
wherein said beam steering elements directs the ring-shaped energy distribution of the optical transmit signal through the annular region into the free-space optical path;
wherein light returned from the scene reflects off the center region to the detector.

9. The optical sensor of claim 1, wherein the annular region of the ASE occupies less than 20% of the aperture.

10. The optical sensor of claim 1, wherein said common Tx/Rx telescope produces an intermediate image at a first field stop from received light, said free-space optical path including gimbal optics that couple light across the first and second gimbal axes and off-gimbal focusing optics that relay the intermediate image of the scene to the off-gimbal detector, wherein the ASE is positioned off-gimbal within the focusing optics.

11. The optical sensor of claim 1, wherein one or more off-gimbal optical sources emit light at a plurality of transmission wavelengths, wherein the annular region of the ASE couples the light at the plurality of transmission wavelengths to the common Tx/Rx telescope and the center region of the ASE couples light received by the common Tx/Rx telescope to the off-gimbal detector to image the scene.

12. The optical sensor of claim 1, further comprising a guided munition on which the optical sensor is mounted.

13. The optical sensor of claim 1, further comprising an autonomous vehicle on which the optical sensor is mounted.

14. The optical sensor of claim 1, further comprising:
a filter wheel positioned between the ASE and the detector, said filter wheel including at least a first filter segment configured to pass a returned optical transmit signal at the first transmission wavelength and a second filter segment configured to block the returned optical transmit signal and pass passive emissions from at least some of the plurality of other wavelengths,
wherein said off-gimbal detector alternately produces active and passive images of the scene.

15. The optical sensor of claim 14, further comprising:
control circuitry coupled to the detector, said control circuitry configured to process passive images of the scene to detect a target, to activate the optical source to emit the optical transmit target to illuminate the target, to process an active image of the target to provide close-loop feedback to point the optical sensor at the target, and to process passive images of the target.

16. An optical sensor, comprising:
an outer gimbal that rotates around a first gimbal axis;
an inner gimbal that rotates around a second gimbal axis orthogonal to the first gimbal axis to point an optical axis in a multi-dimensional space defined by said first and second gimbal axes;
a common Tx/Rx telescope mounted on the inner gimbal along the optical axis;
an off-gimbal optical source that emits laser energy at a first transmission wavelength at a fixed off-gimbal access point;
a beam shaping element that forms the laser energy into an optical transmit signal having a ring-shaped energy distribution;
an off-gimbal detector responsive to light at a plurality of wavelengths;
a free-space optical path along the first and second gimbal axes to couple light from the common Tx/Rx telescope to the off-gimbal detector;
an off-gimbal aperture sharing element (ASE) positioned in a common Tx/Rx aperture in the free-space optical path, said ASE comprising a center region and an annular region,
wherein the ring-shaped energy distribution of the optical transmit signal is directed onto the annular region of the ASE to free-space couple the optical transmit signal into the free-space optical path to the common Tx/Rx telescope while maintaining the ring-shaped energy distribution for transmission towards a scene,
wherein light returned from the scene including a returned optical transmit signal at the first transmission wavelength and passive emissions at a plurality of other wavelengths and received by the common Tx/Rx telescope is directed onto the center region of the ASE to free-space couple the light towards the off-gimbal detector to image the scene; and
a filter wheel positioned between the ASE and the detector, said filter wheel including at least a first filter segment configured to pass the returned optical transmit signal at the first transmission wavelength and a second filter segment configured to block the returned optical transmit signal and pass the passive emissions from at least some of the plurality of other wavelengths;

wherein said off-gimbal detector alternately produces active and passive images of the scene.

17. The optical sensor of claim 16, further comprising:

a focusing optic that reduces the divergence of the optical transmit signal so that the ring-shaped energy distribution of optical transmit signal exiting the common Tx/Rx telescope is either collimated or slightly converging.

18. The optical sensor of claim 15, wherein said beam shaping element is one of an Axicon lens, an Unstable Optical Resonator, a Liquid Crystal Waveguide (LCWG), a Risley Prism or a Micro-Electro-Mechanical System (MEMS) Micro-Mirror Array (MMA).

* * * * *

UNITED STATES PATENT AND TRADEMARK OFFICE
CERTIFICATE OF CORRECTION

PATENT NO. : 11,686,820 B2
APPLICATION NO. : 17/071767
DATED : June 27, 2023
INVENTOR(S) : Keller et al.

Page 1 of 1

It is certified that error appears in the above-identified patent and that said Letters Patent is hereby corrected as shown below:

In the Specification

In Column 7, Line 24, delete "102" and insert --100-- therefor

Signed and Sealed this
Twenty-fourth Day of September, 2024

Katherine Kelly Vidal
*Director of the United States Patent and Trademark Office*